April 24, 1951 C. E. JOHANSSON 2,549,906
SHIPPING CONTAINER FOR AIRCRAFT ENGINES
Filed April 18, 1945 3 Sheets-Sheet 1
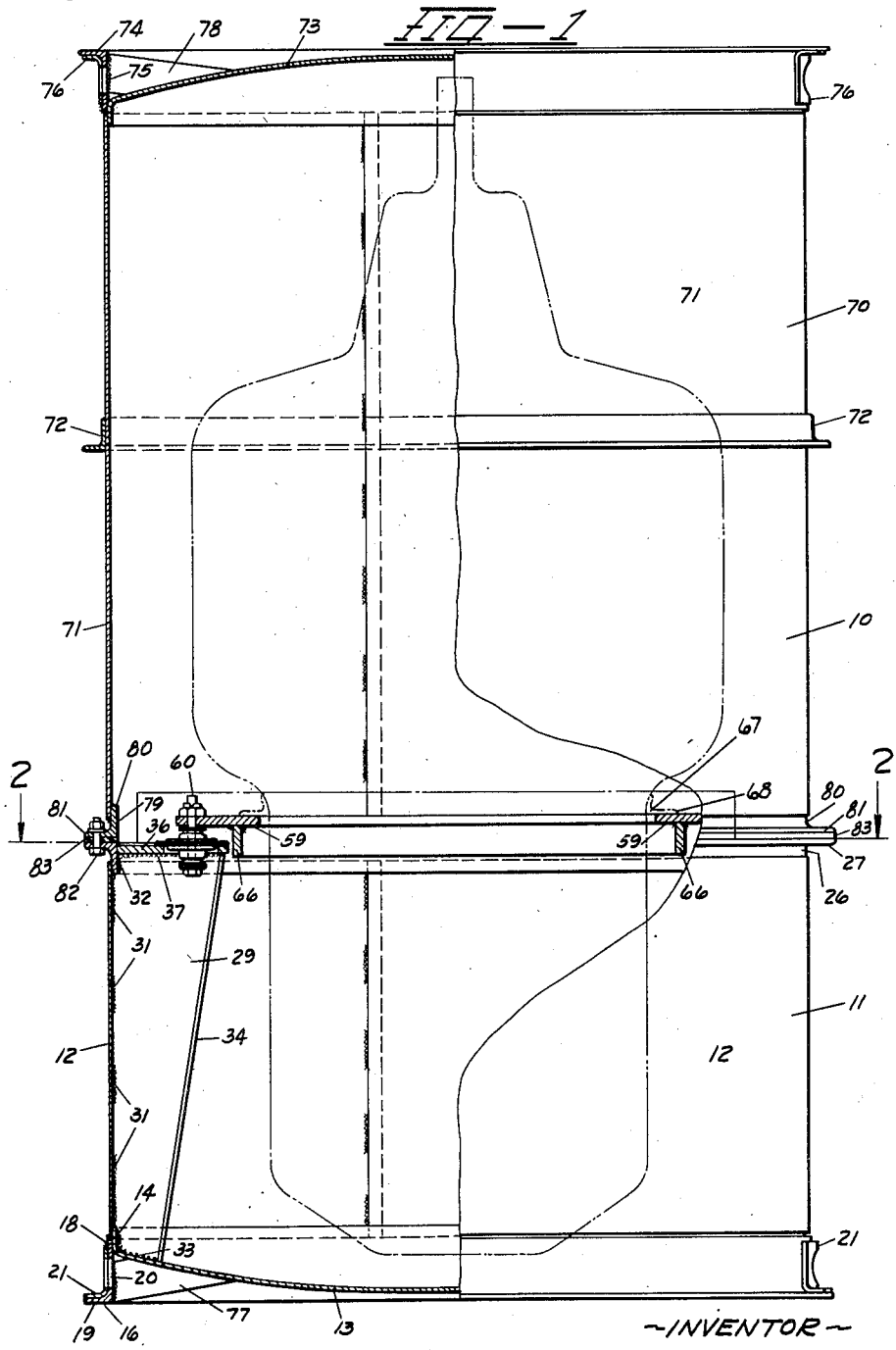
~INVENTOR~
CARL E. JOHANSSON
BY~Samuel Reese
~ATTY.~

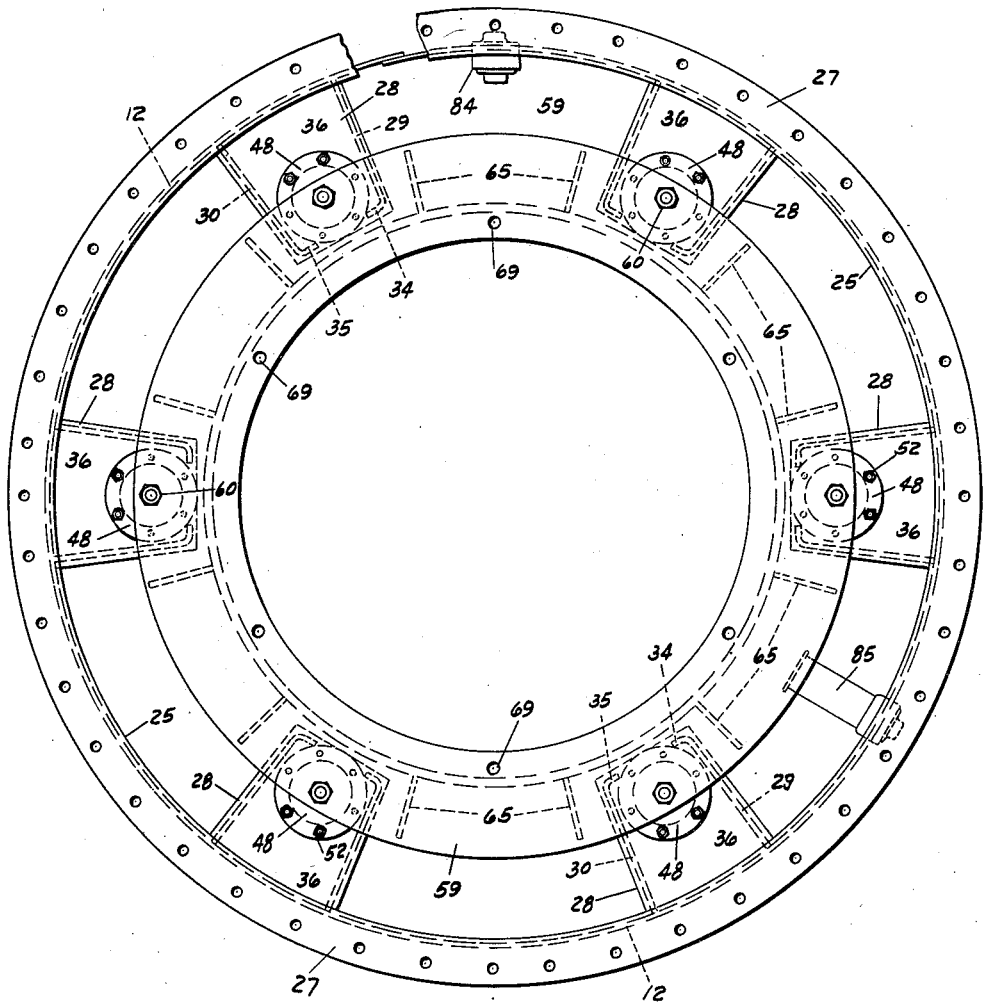

April 24, 1951 C. E. JOHANSSON 2,549,906
SHIPPING CONTAINER FOR AIRCRAFT ENGINES
Filed April 18, 1945 3 Sheets—Sheet 3
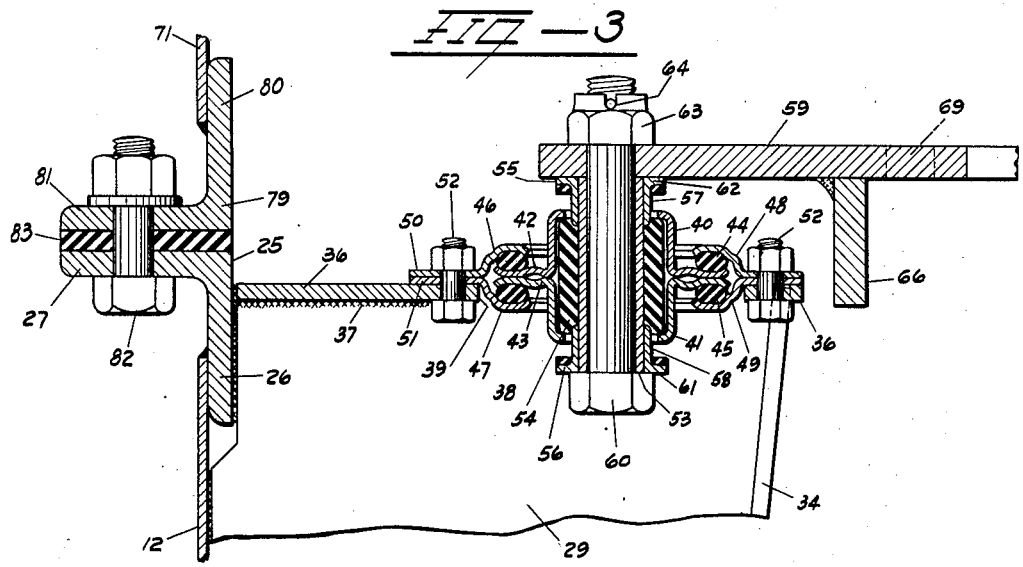
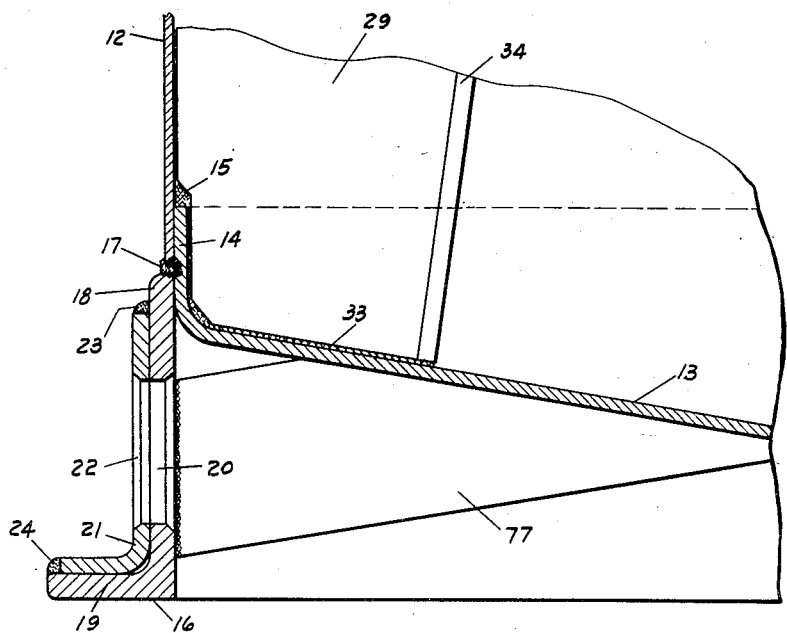
~ INVENTOR ~
CARL E. JOHANSSON
BY ~ Samuel Reese
~ ATTY. ~

Patented Apr. 24, 1951

2,549,906

UNITED STATES PATENT OFFICE 2,549,906

SHIPPING CONTAINER FOR AIRCRAFT ENGINES

Carl E. Johansson, Cleveland, Ohio, assignor to The Youngstown Steel Door Company, Cleveland, Ohio, a corporation of Ohio Application April 18, 1945, Serial No. 589,003

12 Claims. (Cl. 206—46)

1

This invention relates to shipping containers for aircraft engines.

It is an object of this invention to provide shipping containers for aircraft engines which shall protect the engine from damage by blows against the container.

A further object is to provide shipping containers for aircraft engines embodying engine supports disposed wholly within the containers.

A further object is to provide shipping containers for aircraft engines embodying means for yieldingly supporting the engines.

A further object is to provide shipping containers for aircraft engines embodying engine supports which shall simplify and facilitate the securement of engines thereupon.

A further object is to provide shipping containers for aircraft engines embodying engine supports which serve to reinforce the container.

A further object is to provide shipping containers for aircraft engines which shall effect a reduction in the number of engine supports required.

A further object is to provide shipping containers for aircraft engines which shall require the least number of sections.

A further object is to provide shipping containers for aircraft engines which shall be weathertight and capable of being dropped into the water and floated ashore.

Other objects of the invention will become clear as the description thereof proceeds.

In the drawings forming part of this specification:

Fig. 1 is a view partly in elevation and partly in section of a container embodying the instant invention.

Fig. 2 is a horizontal section taken on line 2—2 of Fig. 1.

Fig. 3 is an enlarged sectional detail with parts broken away of a portion of the container.

Referring to the drawings which illustrate a preferred embodiment the numeral 10 designates in its entirety a container incorporating the instant invention. The container 10 embodies a section 11 having a cylindrical wall 12 formed of metal. One end of the wall 12 is closed by means of a dished end wall 13. The end wall 13 is flanged around its periphery as indicated at 14. The peripheral flange or skirt 14 is inserted within the cylindrical wall 12 and is held against the inner face thereof as by means of tack welding 15. Securement of the cylindrical wall 12 circumferentially to the skirt 14 is obtained by means of welding 17 which

2 is further utilized to secure an angle member 16 to the skirt. This securement is effected with the vertically disposed leg 18 of the angle member which extends beyond the end wall 13 so that the horizontally disposed leg 19 of the angle member may serve as a base or support for the container. To permit hoisting of the container the vertical leg 18 is formed with opposed openings 20 through which a hoisting cable or hoisting hooks may extend. To compensate for the loss of section occasioned by the openings 20, the angle member 16 is reinforced by an angular plate 21 which is formed with openings 22 registering with the opening 20 in the angle member 16. Securement of the angular plate 21 and the angle member 16 may be had by means of welding as indicated at 23 and 24. The upper end of the cylindrical wall 12 is reinforced by means of a cylindrical angle member 25 disposed with its vertical leg 26 in contact with and welded to the inner face of the wall and its horizontal leg 27 lying above the wall 12 and extending outwardly therefrom.

The aircraft engine or the like indicated in dot and dash lines in Fig. 1 of the drawings is adapted to be supported within the section 11 of the container. To this end a plurality of equally spaced brackets 28 are secured within the section 11. While the drawing illustrates a preference for six of these brackets, which are equally spaced, it is to be understood that the instant invention is not limited either to the number or to the spacing shown. Each of these brackets embodies vertical plates 29 and 30 which as more clearly appears from Fig. 2 of the drawings are spaced apart. The plates 29 and 30 are secured as by means of welding as indicated at 31 to the wall 12 of the section 11 and to the vertical leg 26 of the angle member 25 as indicated at 32. Each of the plates 29 and 30 extends from substantially the top of the angle member 25 to the end wall 13 to which it is secured as by means of welding as indicated at 33. The inner ends of the plates 29 and 30 are flanged toward each other as shown at 34 and 35.

In addition to the plates 29 and 30 each bracket 28 embodies a horizontally disposed plate 36 which is secured upon the plates 29 and 30 as by means of welding as indicated at 37.

Each bracket 28 carries a flexible mounting designated in its entirety by the reference numeral 38 intermediate the plates 29 and 30.

The flexible mountings 38 are secured to the horizontally disposed plates 36 of the bracket members and for this purpose an opening 39 is formed in each of said plates. A pair of annular hollow opposed bosses 40 and 41 are disposed within the opening 39. The boss 40 is formed with a peripheral flange 42 and the boss 41 with a peripheral flange 43 disposed in contact with the flange 42. These opposed flanges are received between the upper and lower rubber rings 44 and 45 disposed within diverging portions 46 and 47 of opposed annular members 48 and 49. These annular members embody contacting peripheral flanges 50 and 51 which lie beyond the opening 39 in the plate 36 and are secured to said plate as by means of bolts 52. Fastening of the bolts 52 is facilitated by the spacing of the plates 29 and 30 of each bracket.

A sleeve 53 extends through the bosses 40 and 41. An annular rubber member 54 is disposed between the sleeve 53 and the bosses 40 and 41. Circumferential angle members 55 and 56 are secured to the ends of the sleeve 53 and are arranged with their legs vertical and horizontal. The vertical legs 57 and 58 extend into the bosses 40 and 41 so as to engage the annular rubber member 54 and transmit any load upon the angle members 55 and 56 to the rubber member 54.

A supporting annular plate 59 is secured upon the flexible mountings. As clearly shown in Fig. 2 of the drawings the annular supporting plate 59 is spaced a substantial distance from the inner face of the wall 12 for a purpose which will later appear. To secure the plate 59 upon the rubber mounting a bolt 60 is passed upwardly through the sleeve 53 so that the head of the bolt will engage the horizontal flange 61 of the angle member 56. Each of the bolts 60 passes through an opening in the annular plate 59 which rests upon the horizontal flange 62 of the angle member 55. Nuts 63 are then threaded upon the bolts 60 and are secured thereon as by means of cotter pins 64.

The annular supporting plate 59 is reinforced by means of radial ribs 65 and by means of an annular ring 66. As appears more clearly from Fig. 3 of the drawings the reinforcing ring 66 is disposed adjacent and extends below the top of the plate 36 of each bracket. By reason of this disposition the reinforcing ring 66 is adapted to contact the brackets 28 and limit sidewise movement of the supporting plate 59 and the engine or the like supported thereby. The drawings indicate that the supporting plate 59 and its reinforcements 65 and 66 are formed of plate members. It will be understood that these parts may as readily be formed as an integral casting if desired.

To support an aircraft engine or the like upon the supporting plate 59 a ring 67 whose attachment to the aircraft engine will vary in accordance with the structure of the engine is secured thereto in any desired manner. This ring is provided with a horizontal flange 68 which is adapted to lie upon the supporting plate 59 and is formed with openings adapted to register with the openings 69 formed in the supporting plate 59 so that bolts may be passed through the registering openings in order to secure the engine ring to the supporting plate. Regardless of the character of the engine ring, it will always be formed with openings adapted to register with the openings 69 in the supporting plate so that the latter may be utilized to support engines of different contours and construction.

It will be clear from Fig. 2 of the drawings that the spacing of the supporting plate 59 from the wall 12 of the container section 11 facilitates the securement of an aircraft engine or the like by means of bolts because ample room is provided for the insertion and fastening of the bolts.

When the aircraft engine or the like is secured in position upon the supporting plate 59, it is protected by means of a cover section 70. This cover section embodies a cylindrical wall 71 preferably reinforced by means of a circumferential angle member 72. One end of the wall 71 is closed by means of an end plate 73 similar to the end plate 13 and similarly associated with and secured to the cylindrical wall 71. A circumferential angle member 74 is secured to the cylindrical wall 71 and end wall 73 in the same manner as angle member 16 is secured to the end wall 13 and cylindrical wall 12. The angle member 74 extends beyond the end wall 73 so as to serve as a base if the container in inverted. Opposed openings 75 similar to the openings 20 are formed in the angle member 74 which is reinforced adjacent to these openings by means of angle plates 76. The angle member 16 and the angle member 74 are braced by means of plates 77 and 78 secured as by means of welding to the angle members and to the end walls 13 and 73, respectively.

The other end of the cylindrical wall 71 is reinforced by means of a cylindrical angle member 79, the vertical leg 80 of which is secured to the inner face of the wall as by means of welding. The horizontal leg 81 of the angle member 79 extends outwardly similar to the leg 27 of angle member 25 of the section 11. The sections 11 and 70 are adapted to be fastened together by means of a plurality of bolts 82 adapted to extend through alined openings in the horizontal flanges 27 and 81 of the angle members 25 and 79. To insure a weathertight container, a flexible gasket 83 is interposed between the horizontal flanges 27 and 81.

An air valve indicated generally at 84 permits air or other gas to be forced into the container under pressure. A receptacle for a log book is indicated at 85.

The simplicity of the container structure and the ease of supporting an aircraft engine or the like therein is believed to be apparent from the foregoing description. The supporting structure of the container is disposed wholly therein so as to lessen the chance of damage to the structure. The brackets upon which the engine is supported serve to brace the wall of the section 11 of the container. The flexible supports for the engine permit its movement vertically and horizontally so that forces which might otherwise tend to damage the engine are dissipated. This flexible support is effective even if the container is turned on its side or end for end. It makes possible, moreover, the elimination of the customary additional support for the container which usually embraces the projecting portion of the engine shaft. The danger of binding of the engine between two supports and consequent distortion thereof is thereby avoided.

It will be observed from Figs. 1 and 2 of the drawings that the ends of the cylindrical walls are overlapped and welded together rather than butt-welded. By this expedient the proper internal diameter of the walls is insured.

It will be apparent that numerous changes and modifications in the details of the invention will be clear to those skilled in the art. It is intended, therefore, that all such modifications and changes be comprehended within this invention which is to be limited only by the scope of the claims appended hereto.

I claim:

1. A shipping container comprising a section embodying a peripheral wall having a closed end and an open end, a plurality of pairs of spaced plate members secured to said wall within said section, a plate spanning and secured to each pair of vertical plate members, flexible mountings carried by said spanning plates, an annular member supported by said mountings, and a cover section releasably secured to said open end and closing said first mentioned section.

2. A shipping container comprising a section embodying a peripheral wall having a closed end and an open end, a plurality of pairs of spaced plate members secured to said wall within said section, a plate spanning and secured to each pair of plate members, flexible mountings carried by said spanning plates, an annular member supported by said mountings, and a cover section releasably secured to said open end and closing said first mentioned section, said annular member being spaced from the wall of said latter section, for the purpose set forth.

3. A shipping container comprising a section embodying a peripheral wall having a closed end and an open end, spaced brackets secured to said wall within said section, flexible mountings carried by said brackets, an annular member supported by said mountings, an annular reinforcing rib depending from said annular member, said rib lying adjacent to and extending below the top of said brackets, said rib being adapted to engage said brackets to limit movement of said annular member in its own plane, and a cover section releasably secured to said open end and closing said first mentioned section.

4. A shipping container comprising a section embodying a peripheral wall having a closed end and an open end, a plurality of pairs of spaced plate members secured to said wall within said section, a plate spanning and secured to each pair of plate members, flexible mountings carried by said spanning plates for supporting an article thereon and a cover section releasably secured to said open end and closing said first mentioned section.

5. A shipping container comprising a section embodying a peripheral wall, an end wall secured to one end of said peripheral wall, the other end of said peripheral wall being open, spaced brackets secured to said peripheral wall within said section, said brackets extending from substantially the open end of said peripheral wall to said end wall and being secured to said end wall, a member secured to said section and extending beyond said end wall and forming a base for said section, bracing plates extending between and secured to said base member and said end wall, and a cover section releasably secured to said open end and closing said first mentioned section.

6. A shipping container comprising a section embodying a peripheral wall, an end wall secured to one end of said peripheral wall, the other end of said peripheral wall being open, spaced brackets secured to said peripheral wall within said section, said brackets extending from substantially the open end of said peripheral wall to said end wall and being secured to said end wall, a member secured to said section and extending beyond said end wall and forming a base for said section, bracing plates extending between and secured to said base member and said end wall, and a cover section releasably secured to said open end and closing said first mentioned section, said base member being formed with openings adapted to receive hoisting means.

7. A shipping container comprising a section embodying a peripheral wall having a closed end and an open end, a plurality of pairs of spaced vertical plate members secured to said wall within said section, a plate spanning and secured to each pair of vertical plate members, said pairs of spaced plate members extending from substantially the open end of said peripheral wall to said end wall and being secured to said end wall, and a cover section releasably secured to said open end and closing said first mentioned section.

8. An airplane engine shipping container comprising a supporting section embodying a peripheral wall having a closed end and an open end, a flange extending outwardly from said wall around the open end thereof, spaced brackets secured to said wall within said section, flexible mountings secured to said brackets, an annular member secured to said mountings, and a cover section having a peripheral wall, one end of which is closed and the other end open, a flange extending outwardly from said latter wall around the open end thereof, and means releasably fastening said flanges together to secure said cover section to said supporting section, said annular member being spaced from the wall of said supporting section, for the purpose set forth.

9. An airplane engine shipping container comprising a supporting section embodying a peripheral wall, an end wall secured to one end of said peripheral wall, the other end of said peripheral wall being open, a flange extending outwardly from said wall around the open end thereof, spaced brackets secured to said peripheral wall within said section, said brackets extending from substantially the open end of said peripheral wall to said end wall and being secured to said end wall, flexible mountings secured to said brackets, an annular member secured to said mountings and a cover section having a peripheral wall, one end of which is closed and the other end open, a flange extending outwardly from said latter wall around the open end thereof, and means releasably fastening said flanges together to secure said cover section to said supporting section.

10. An airplane engine shipping container comprising a supporting section embodying a peripheral wall, an end wall secured to one end of said peripheral wall, the other end of said peripheral wall being open, a flange extending outwardly from said wall around the open end thereof, spaced brackets secured to said peripheral wall within said section, said brackets extending from substantially the open end of said peripheral wall to said end wall and being secured to said end wall, an annular supporting member, means securing said member to said brackets, and a cover section having a peripheral wall, one end of which is closed and the other end open, a flange extending outwardly from said latter wall around the open end thereof, and means releasably fastening said flanges together.

11. An airplane engine shipping container comprising a supporting section embodying a peripheral wall, an end wall secured to one end of said peripheral wall, the other end of said peripheral wall being open, a flange extending outwardly from said wall around the open end thereof, spaced brackets secured to said peripheral wall within said section, said brackets extending from substantially the open end of said peripheral wall to said end wall and being secured to said end wall, and a cover section having a peripheral wall, one end of which is closed and the other end open, a flange extending outwardly from said latter wall around the open end thereof, and means releasably fastening said flanges together to secure said cover section to said supporting section.

12. A shipping container comprising a section embodying a peripheral wall having a closed end and an open end, a plurality of pairs of spaced vertical plate members secured to said wall within said section, a plate spanning and secured to each pair of vertical plate members, and a cover section releasably secured to said open end closing said first mentioned section.

CARL E. JOHANSSON.

REFERENCES CITED

The following references are of record in the file of this patent:

UNITED STATES PATENTS

| Number | Name | Date |
|---|---|---|
| 69,272 | Tibbals | Sept. 24, 1867 |
| 1,199,311 | Sheehan | Sept. 26, 1916 |
| 1,359,057 | Guldaman | Nov. 16, 1920 |
| 1,485,408 | Miller | Mar. 4, 1924 |
| 2,057,347 | Reed | Oct. 13, 1936 |
| 2,062,589 | Lucas | Dec. 1, 1936 |
| 2,185,821 | Skinner | Jan. 2, 1940 |
| 2,300,259 | Kueppers | Oct. 27, 1942 |
| 2,335,451 | Saulnier | Nov. 30, 1943 |
| 2,355,804 | Hutchinson | Aug. 15, 1944 |
| 2,372,712 | Crawford | Apr. 3, 1945 |
| 2,418,868 | Cole et al. | Apr. 15, 1947 |

FOREIGN PATENTS

| Number | Country | Date |
|---|---|---|
| 759,732 | France | Nov. 23, 1933 |